Sept. 3, 1940.    E. K. BENEDEK    2,213,236
FLUID PRESSURE POWER PUMP OR MOTOR
Filed March 30, 1936    7 Sheets-Sheet 1

FIG_1

INVENTOR.
Elek K Benedek
BY:
ATTORNEY.

Sept. 3, 1940.　　　E. K. BENEDEK　　　2,213,236
FLUID PRESSURE POWER PUMP OR MOTOR
Filed March 30, 1936　　　7 Sheets-Sheet 2

INVENTOR.
ELEK K BENEDEK.
BY
ATTORNEY.

Sept. 3, 1940.   E. K. BENEDEK   2,213,236
FLUID PRESSURE POWER PUMP OR MOTOR
Filed March 30, 1936   7 Sheets-Sheet 3

Inventor
ELEK K BENEDEK
By
his Attorney.

Sept. 3, 1940.  E. K. BENEDEK  2,213,236
FLUID PRESSURE POWER PUMP OR MOTOR
Filed March 30, 1936  7 Sheets-Sheet 4

Inventor

ELEK K BENEDEK

Sept. 3, 1940.  E. K. BENEDEK  2,213,236
FLUID PRESSURE POWER PUMP OR MOTOR
Filed March 30, 1936  7 Sheets-Sheet 5
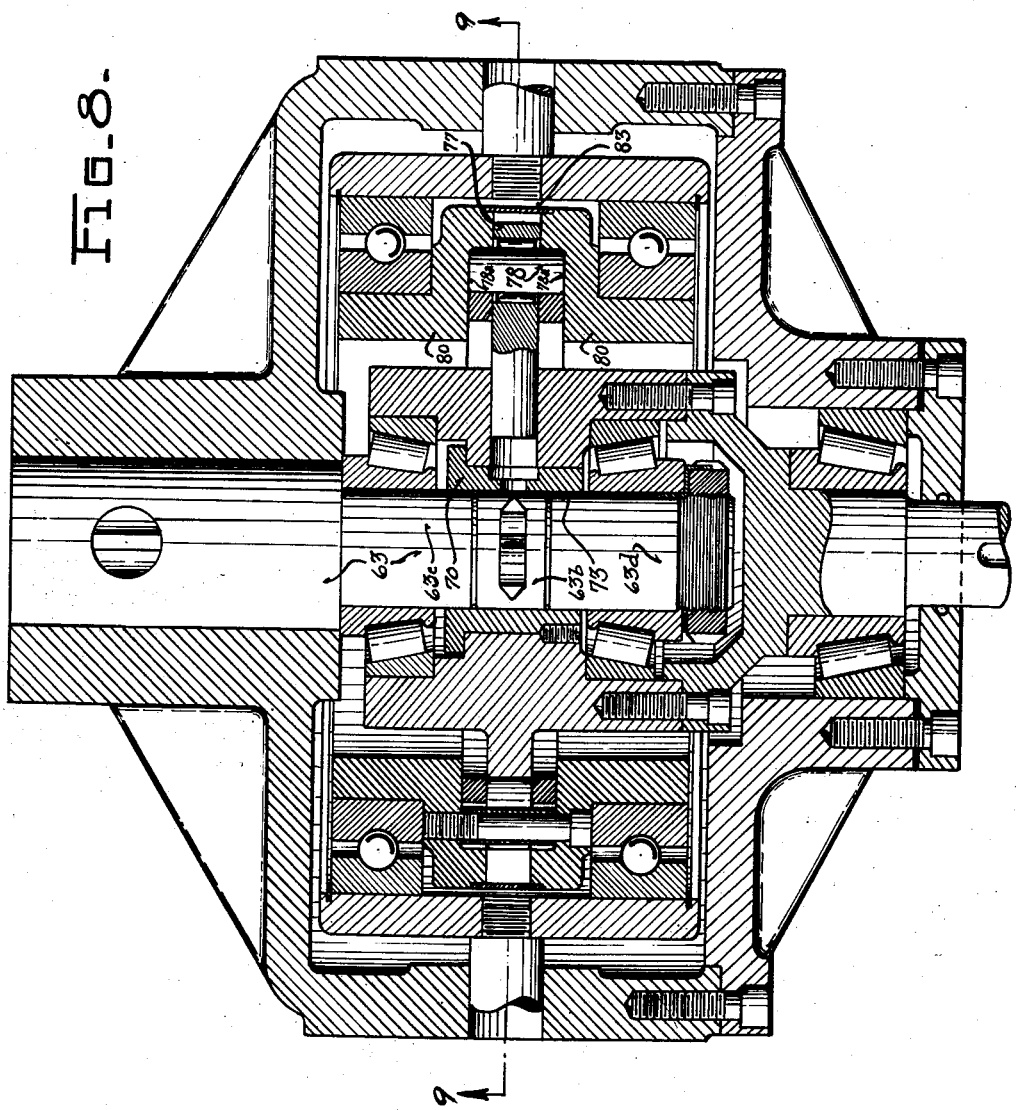
INVENTOR
ELEK K BENEDEK
BY
ATTORNEY Sept. 3, 1940.                E. K. BENEDEK                2,213,236
                      FLUID PRESSURE POWER PUMP OR MOTOR
                       Filed March 30, 1936        7 Sheets-Sheet 6
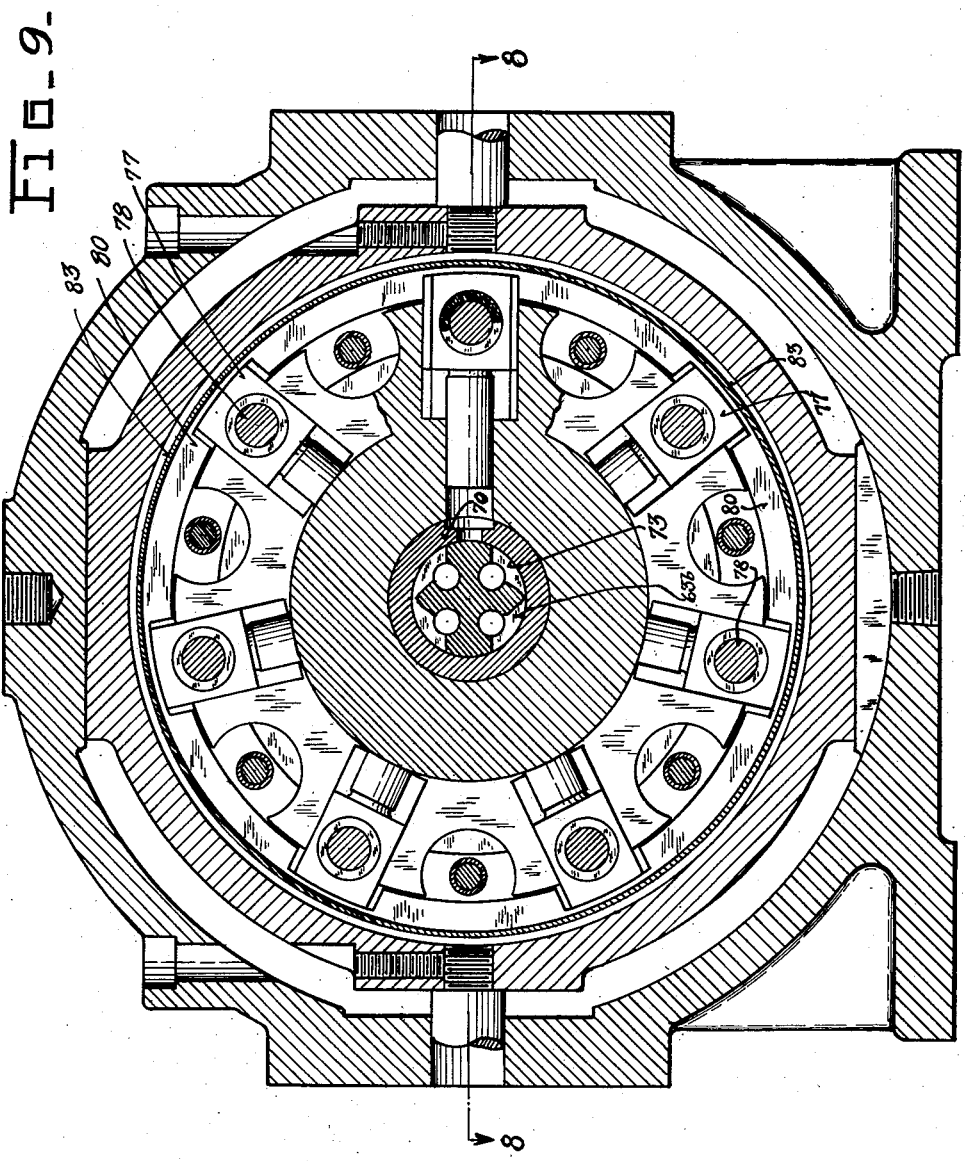
INVENTOR
ELEK K BENEDEK
BY:
ATTORNEY

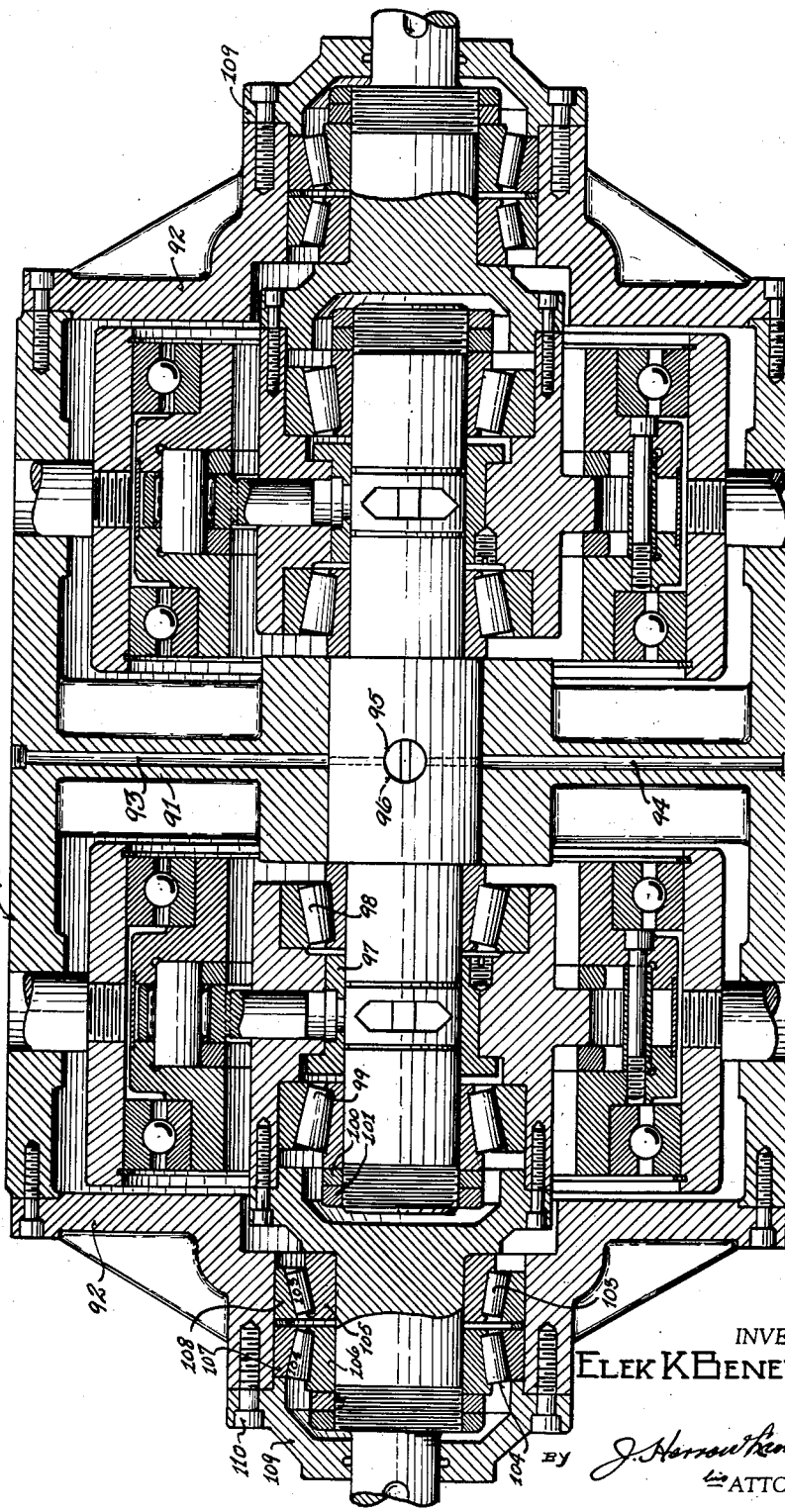

Patented Sept. 3, 1940

2,213,236

UNITED STATES PATENT OFFICE 2,213,236

FLUID PRESSURE POWER PUMP OR MOTOR

Elek K. Benedek, Bucyrus, Ohio

Application March 30, 1936, Serial No. 71,539

6 Claims. (Cl. 103—161)

This invention relates to rotary radial piston pumps and motors and particularly to a new and improved cylinder barrel, the mounting therefor, and the method of forming the same.

The principal objects of the present invention are to provide a rigid, non-yielding pintle and a cooperating rigid non-yielding barrel, capable of withstanding pressure fluid, torque and reactance forces without distortion, and mounted in coaxial relationship to each other with positive, but slight and very accurate, radial clearance therebetween and to adjustably cooperate the same for controlling the radial clearance by utilizing adjustable anti-friction bearing means in a novel manner.

Correlative objects are to provide a mounting of this character through the medium of tapered commercial anti-friction bearings, so arranged as to relieve the pintle from excess radial loads and axial thrusts, and to mount the pintle fixedly at one end directly in the casing of the pump or motor and, at the other end, to support the same indirectly in the casing.

A specific correlative object is to unload the radial and axial load as much as possible from the indirectly supporting anti-friction means at the unmounted end of the pintle by providing a non-yielding connection between the impeller and barrel and an appropriate mounting for the barrel and impeller.

Another object is to provide a pump or motor structure of which the component parts may be accurately manufactured by quantity production methods and without specialized machinery, and, when assembled, will operate with high efficiency.

Equally important objects are to provide a highly efficient and economical barrel and a method of forming the same by virtue of which each part is of the best material for performing the particular function for which intended and cost, size and durability are greatly increased and accuracy of the coacting parts is assured.

Another object is to provide a pump and a motor which have particular advantages as component parts of hydraulic transmissions.

Other objects and advantages will become apparent from the following specification wherein reference is made to the drawings in which Fig. 1 is a longitudinal sectional view of a pump or motor embodying the principles of the present invention and is taken on a plane through the axis of rotation;

Fig. 8 is a view corresponding to Fig. 1, illustrating a slightly modified form of the invention, and is taken on line 8—8 in Fig. 9;

Fig. 9 is a cross sectional view taken on a plane indicated by the line 9—9 in Fig. 8; and Fig. 10 is a longitudinal sectional view of a transmission employing the pump and motor of the present invention and is taken on a plane through the axis of rotation.

Figure 1:
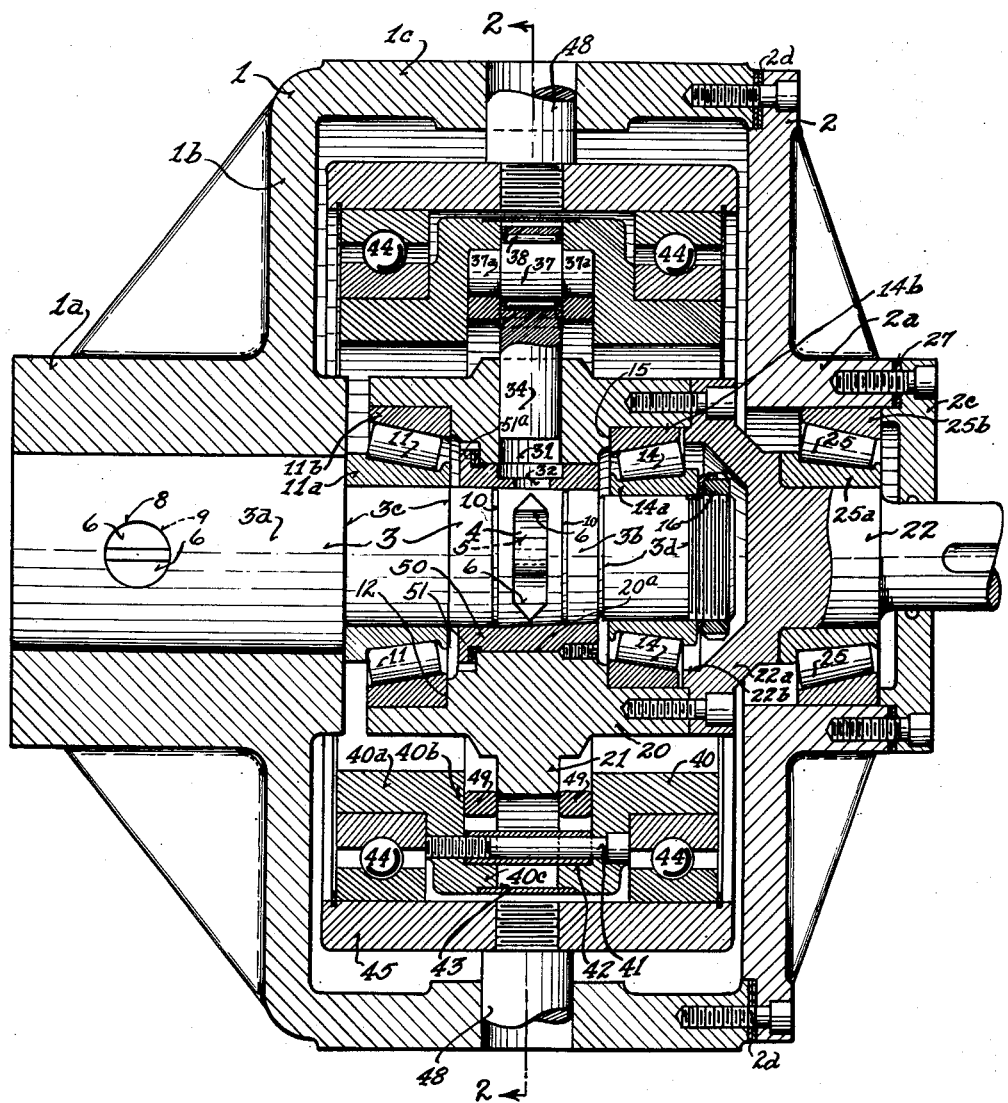
Figure 2:
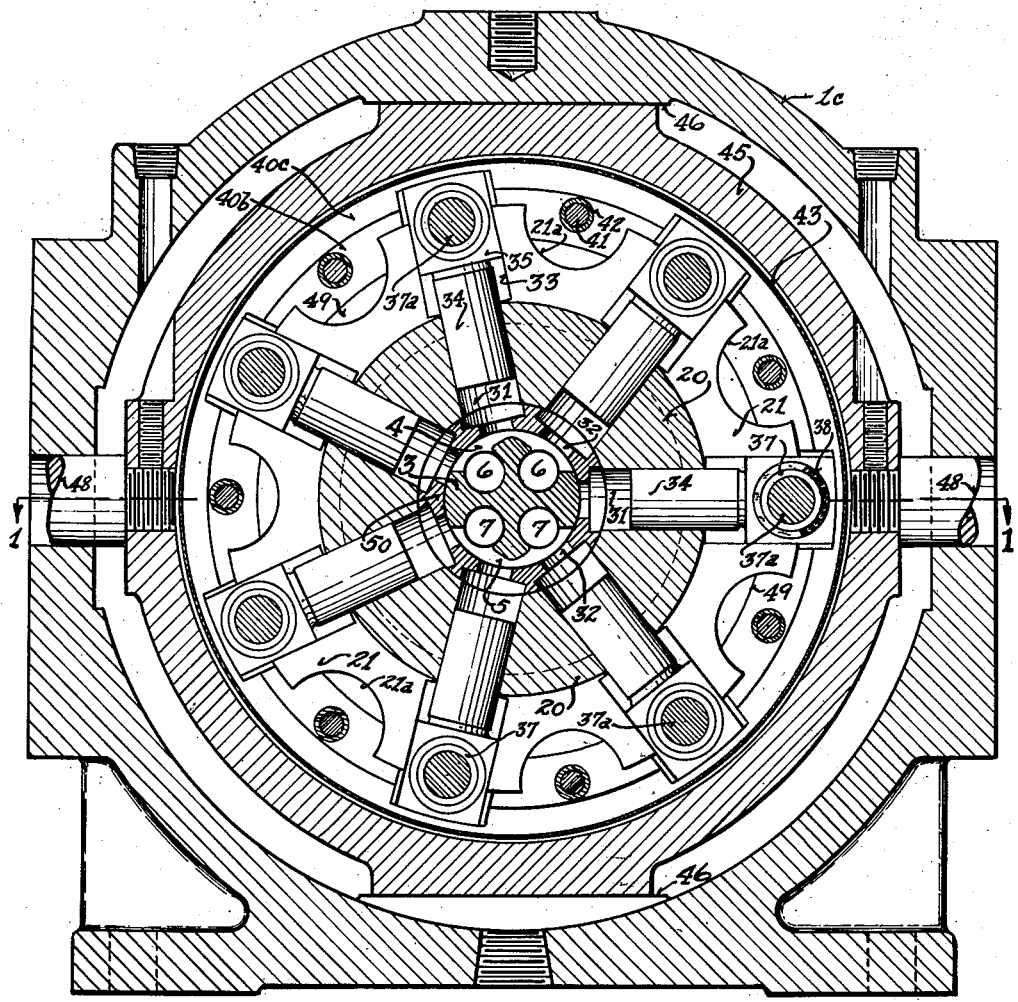
Fig. 2 is a cross sectional view taken on a plane indicated by the line 2—2 of Fig. 1.

Referring first to the pump or motor generally and the manner of mounting the barrel thereof, reference is made to Figs. 1 and 2, wherein is illustrated a pump or motor mounted in a rigid weight supporting casing. The casing, designated generally as 1, has a rigid hub portion 1a with an integral radial flange portion 1b terminating at its outer radial limit in a peripheral wall 1c coaxial with the hub. The casing is closed at the end opposite the hub portion 1a by a rigid cover plate 2 which is fixedly secured to the wall 1c by suitable bolts and has a rigid, outwardly extending hub portion 2a coaxial with the hub portion 1a.

The valve of the pump or motor comprises a rigid pintle 3, having at one end an enlarged shank portion 3a by which it is fixedly secured in a suitable bore in the hub 1a of the casing and from which a portion of the pintle extends axially. The extending portion of the pintle is provided, intermediate its ends, with a valve portion 3b which is tapered in a direction away from the shank 3a and also is provided at the ends of the valve portion 3b with cyclindrical bearing portions 3c and 3d respectively. The valve portion 3b has diametrically opposite reversible valve ports 4 and 5, respectively, which communicate through suitable longitudinal ducts 6 and 7 within the pintle with diametrically opposite main ports 8 and 9, respectively, in the shank portion of the pintle. The ports 8 and 9, in turn, are connected to the usual external fluid circuit through suitable bores, not shown, in the pintle shank portion 3a and the hub of the pintle. At each side of the valve ports 4 and 5, the valve portion 3b has circumferential grooves 10 for assisting in the flow and spread of slip fluid along the valve portion.

Fixedly mounted on the bearing portion 3c of the pintle is a fixed inner race 11a of a set of tapered, anti-friction bearings 11 which are arranged to withstand both axial thrust of the barrel in a direction toward the shank of the pintle and radial load. The outer race 11b of the bearings 11 is fixedly secured in a suitable counterbore 12 in the adjacent end of the barrel. On the bearing portion 3d of the pintle is mounted the inner race 14a of a suitable set of tapered, anti-friction bearings 14 disposed to resist axial thrust in a direction opposite to the bearings 11. The outer race 14b of the bearings 14 is fixedly secured in a suitable counterbore 15 in the corresponding end of the barrel, in a manner similar to the race 11b.

The outer end of the pintle adjacent the bearing portion 3d is threaded to receive a suitable castellated adjusting nut 16 which, through the medium of an interposed lock washer, abuts the outer end of the race 14a so as to adjust the race 14a axially of the pintle. Thus through the medium of the sets of anti-friction bearings 11 and 14, the barrel is accurately supported in coaxial relation with the pintle and with slight but positive and accurate radial clearance between the tapered valve portion of the pintle and correspondingly tapered valve wall of the barrel, later to be described. Consequently, a film of slip fluid is maintained between valving surfaces of the barrel and pintle at all times and provides a hydrostatic balancing effect.

It is desirable for several reasons that the bearings 14 be relieved as much as possible from radial and axial load. First, the deflection (under load) is maximum at the end of the pintle cooperating with the bearings 14 which would cause greater stress and wear of the bearings 14 than of the bearings 11, the deflection being practically zero in the zone of the bearings 11 adjacent which the pintle is rigidly supported. Secondly, the bearings 14 wear appreciably more than the bearings 11.

In order to maintain the initial precision, it is necessary that the bearings 14 be relieved from a considerable portion of the radial load and axial thrust even while efficiently supporting the adjacent end of the pintle for withstanding hydrostatic deflection. To relieve the bearings 14, an additional mounting is provided which indirectly supports the pintle through the medium of the barrel, as will now be described.

The present structure utilizes a barrel 20 having a plurality of radial cylinders, later to be described. Preferably midway between the sets of bearings 11 and 14 and in the zone of the cylinders, the barrel is provided with a reinforcing radial flange 21, the barrel and flange being sufficiently non-yielding and compact to withstand deflection of its axis and distortion. The flange is provided with semi-circular recesses 21a, to accommodate coupling bolts, all as later to be described.

Secured to the end of the barrel adjacent the bearing portion 3d of the pintle, is a rigid, nonyielding impeller shaft 22. At its inner end, the impeller has a rigid radially extending flange portion 22a which lies in abutting relation to the end of the barrel and is rigidly secured thereto by suitable bolts, as illustrated. On the flange portion 22a is an integral hub portion which is coaxial with the flange and impeller and which, when the impeller and barrel are connected together, is seal fitted within the counterbore 15 of the barrel and accurately and rigidly centers the barrel and impeller so that they form, in operating effect, a substantially unitary non-yielding structure.

In order to relieve the bearings 14 from a major portion of the radial load and axial thrust, an internal race 25a of a set of tapered anti-friction roller bearings 25, is fixedly mounted on the impeller. An outer race 25b is mounted in the hub portion 2a of the cover plate for adjustment axially thereof. The bearings 25 are tapered so as to resist axial thrust of the barrel in the direction of taper of the pintle valve portion and also to transfer radial load to the casing. For adjusting the bearings 25 through the medium of the race 25b, a supplemental end cover plate 2c is bolted to the end of the hub portion 2a, suitable shims 27 being interposed between the two for controlling the amount of adjustment.

By this arrangement, the barrel is supported through the medium of the bearings 11 adjacent the pintle shank portion 3a, on a pintle portion which provides a substantially non-yielding support while the opposite end of the barrel, through the medium of non-yielding impeller 22 and its non-yielding connection with the barrel, is supported also directly in the casing through the medium of the bearings 25. Furthermore, the adjustment of the barrel axially for reducing diametral slackness of the bearings and withstanding radial load and axial trust is taken directly in the heavy rigid casing and the adjustment thereof is through the medium of the rigid casing. By adjusting the bearings 25 opposite to the direction of taper, the barrel can be maintained accurately in its coaxial position with the desired fit and freedom of the bearings 11, thus relieving the bearings 14 from axial thrust and radial load occasioned by working pressure fluid and reactances in the barrel. The bearings 14 being thus relieved do not wear appreciably and may be adjusted, without affecting the adjustment and operation of the bearings 11, to just proper position to maintain the pintle accurately in coaxial relation with positive radial clearance in the barrel bore, thus indirectly supporting the adjacent end of the pintle for withstanding hydrostatic deflection thereof.

Referring briefly to the cooperating structure, the barrel 20 has, in additional to the counterbores 12 and 15, an axial bore 20a in which is fitted a valve insert 50, later to be described, the insert, in turn, having an internal bore tapered complementarily to the valve portion 3b of the pintle. In the zone of the flange 21, the barrel has a plurality of radial cylinders 31 each of which has a cylinder port 32 for cooperation with the pintle ports 4 and 5 respectively consequent upon rotation of the barrel. In the flange 21 are radial guideways 33 which are aligned, respectively, with the cylinders 31. Mounted in the cylinders 31, respectively, are pistons 34 having enlarged head portions 35 as better illustrated in Fig. 2, the heads being reciprocable in and guided by the guideways 33 of the flange. Each piston head 35 is preferably rigid with the associated piston and has a transverse bore extending parallel to the axis of rotation in which rotatable thrust pins 37 are mounted on free cageless rollers 38. The pins 37 have reduced outer end portions 37a which are in rolling cooperation with the reactance for reciprocating the pistons.

The reactance comprises a pair of matched reactance elements 40, each of which has a hub portion 40a terminating inwardly in an outwardly extending radial flange portion 40b, the radial flange portion, in turn, terminating at its outer limit in an annular axially extending portion 40c. The reactance elements 40 are rigidly connected together in coaxial relation by suitable tension bolts 41 on which are carried compression spacers 42. The elements 40 are drawn by the bolts 41 tightly against the ends of the spacers 42 for clamping the elements together in accurately fixed, axially spaced relation, thus defining a circumferential recess in which the outer ends of the pistons and crossheads are accommodated. The circumferential wall of the reactance rotor is closed by a suitable oil retaining band 43 held in place in suitable grooves in the elements 40.

For mounting the reactance elements 40 in operating position, the hub portions 40a thereof are mounted in suitable anti-friction bearings 44 which, in turn, are secured in a suitable adjustable stator 45. The stator 45 is directly supported in the casing in the zone of the working reaction on suitable parallel diametrically oppositely positioned slide bearing surfaces 46, and is provided with adjusting rods 48 arranged diametrically opposite each other and parallel to the slide bearing surfaces 46.

In order to accommodate the bolts 41 in the zone of the flange 21 without increasing the radial dimensions of the structure, semi-circular recesses 21a are provided in the flange 21, one recess between each pair of adjacent guideways 33, in position to accommodate the bolts 41 and spacers 42. The recesses 48 have their centers substantially at the outer radial limit of the flange 21 and open outwardly of the flange. Each recess 21a is of such radius relative to the spacers 42 and the maximum eccentricity of the reactance and barrel, that, at maximum stroke, the spacers 42 just clear the peripheral walls of the recesses, for example, with .001 to .002 clearance. Consequently, a positive torque transmission between the barrel and reactance is effected on starting only and after the barrel and reactance are brought up to speed, the torque transmission is effected by the crosspins.

The crosspins 37, being anti-frictionally mounted in the piston heads 35, are free rolling and the end portions 37a thereof roll along the inner annular wall of the portions 40c of the elements 40. In order to hold the pins 37 with their end portions 37a against the portions 40c, and, especially when the structure is used as a pump, to provide means for operating the pistons on the suction stroke, radially floating rings 49 are provided, the rings 49 being identical, smoothly finished on all operating surfaces, and snugly accommodated between the flange 21 and the highly finished radial walls of the flange portions 40b of the reactance elements.

Consequently, the rollers cooperate with the elements 40 and rings 49 as outer and inner races respectively and form therewith an anti-friction caged roller bearing assembly, the caging or circumferential spacing of the rolling pins 37 being the piston heads 35. For an efficient anti-friction roller bearing, however, not only the rollers but also the races must be both hard and finish ground to high precision. Likewise, end guiding of the rollers must be provided. The rolling thrust pins 37 accordingly are so hardened and finished, including the end faces which are finish ground to present a flat surface.

Circumferential grooves would not be accessible for grinding as internal grinders must be used, but with the structure illustrated, both the inner annular wall of the portions 40c and the flat radial wall of the portions 40b of the elements 40 may be finish ground with the usual commercial internal grinders to present hard, polished, and extremely precise operating surfaces. Consequently, each of the elements 40 can be mounted on a suitable support or machine and, when so fixed, all surfaces thereof can be properly machined or ground with one setting to insure accurate coaxial relation. The radial walls of the portions 40b may be so accurately finished that during the free rolling engagement of the end portions 37a of the pins with the portions 40c, the pins may be guided at their ends and prevented from skewing by the radial walls whch engage the flat polished end faces of the pins with slight operating clearance.

Another advantage of the reactance structure resides in the beam construction. For example, assuming that the piston in Fig. 1 is on a pressure stroke, this action would tend to force the elements 40 apart adjacent the piston by swinging them in opposite directions about their respective points of support in the planes of the associated bearings 44. The same action would cause the diametrically opposite portions of the elements to swing toward each other. This piston action continuously migrates about the reactance so that all parts are subjected thereto, but no matter where acting, the tension bolts 41 resist swinging of the elements apart and the compression spacers 42 resist by compression any movement of the elements together opposite the piston. The neutral axis of the beam effect lies at the axis of rotation of the rotor as the bolts and accompanying spacers are positioned radially the same distance therefrom and diametrically opposite to the pistons, and the bolts and spacers are movable axially with respect to each other.

Referring next to Figs. 3 to 7, inclusive, the specific construction of the barrel as a result of which the full effect of the bearings 11 and 14 may be obtained, is illustrated. As mentioned in the objects, the barrel and pintle and various parts should be of material best calculated to withstand the particular stress and wearing effects to which the parts are subjected. The pintle is ordinarily a very expensive part and must withstand great hydrostatic loads and must fit the barrel with accurate but positive clearance. Accordingly the pintle is preferably forged nitralloy having a mirror finish at the valving portion, which may be additionally hardened or nitrided.

If the barrel were correspondingly formed, certain dangers would arise due to the great molecular adhesion resulting from accidental contact of two extremely hard and mirror finished surfaces. For example, if the barrel were correspondingly finished and due to wear, slight misalignment, or hydrostatic deflection, should come in direct contact with the pintle, irreparable damage might be done to either or both instantaneously. Furthermore, if grit or other matter should be carried in the clearance space, it would either be ground and carried along with the fluid and damage other parts of the structure or, if sufficiently hard, would score the cooperating valve surfaces of the pintle and barrel themselves, or both.

On the other hand if the barrel were made of softer material such foreign matter would embed therein instead of scratching the pintle and thus prevent accumulation of foreign matter in the fluid circuit as well as preventing damage to the pintle.

Again, should any inaccuracy be present in either the barrel or pintle, the softer metal would wear rapidly and be lapped with respect to the harder, so as to remove the inaccuracy. But such a soft barrel would wear badly and might yield under heavy loads. Also, replacement of the barrel when damaged would be very expensive. These dangers are pronounced and may reasonably be expected due to the fact that very small and almost microscopic particles of the very materials of which the parts are made are often retained on the parts during manufacture.

The barrel must be capable of withstanding the heavy load and torques without yielding, and, for efficiency, the cylinders thereof be honed to a mirror finish, which honing requires high speed reciprocation between the walls of the cylinders and the honing tool. Again, the ordinary wear resulting from long periods of operation must necessarily wear both pintle and barrel if they are of equal hardness, whereas if one is of softer material than the other, substantially all the wear occurs in the softer material.

Compromises have heretofore been made between long operation and gradual wear of both pintle and barrel followed by replacement of both and shorter operation of one or the other with replacement of one only being necessary at any time. Lastly, the pistons must accurately fit the cylinders and both the piston and cylinder walls must withstand wear due to high speed reciprocation.

The wear occasioned by high speed reciprocation can be withstood and better withstood by far different materials than are necessary for the high speed continuous relative rotation such as existing between the pintle and barrel. I have found that a cylinder barrel made of such materials as cast iron, having the required degree of silica and free graphite and of the quality commonly known as gray iron, meets the above conditions. The irons and other materials now commonly used in the automotive industry for cylinder blocks of internal combustion engines are satisfactory also. Such irons have the required non-yielding properties for withstanding the stresses to which subjected and the free graphite thereof affords a high degree of lubrication for the reciprocating pistons. Further, such metal is comparatively low in cost and may be machined readily. It is not, however, effective for the relatively high speed rotation between the pintle and barrel. Consequently, though the barrel is formed of such materials, it is provided with an enlarged cylindrical bore 20a into which a valve insert 50 is press fitted for cooperation with the pintle. The valve insert 50 is preferably of a material different from the barrel, the exact material depending upon the purpose, the speed, etc. to be withstood. It is preferably of bearing material, such as bronze or special bronze, though in low speed structures or in structures in which the barrel is of a higher quality of material, the insert may be of the same material as the barrel, the only advantages gained in the latter instance being the convenience in manufacture, repair and overhauling. Nitrided gray iron or nitralloy may also be used as the material of the insert 50 in those instances in which the coacting pintle and barrel surfaces may be of substantially equal hardness.

Figure 3:
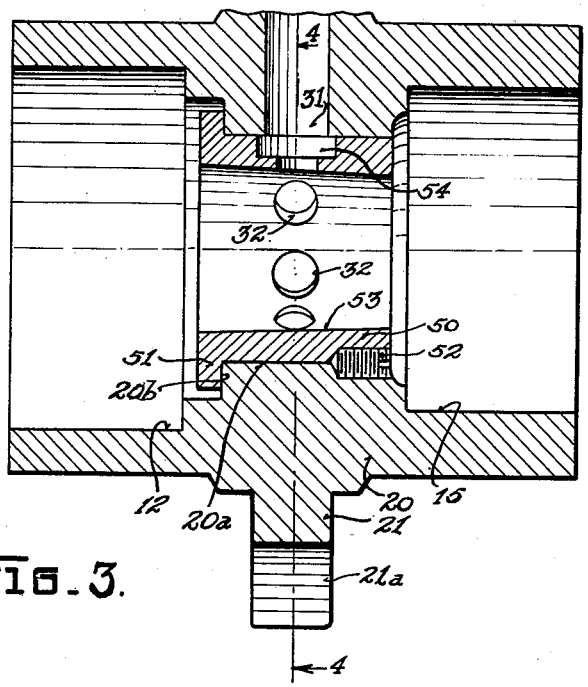
Fig. 3 is a slightly enlarged longitudinal axial sectional view of the barrel and valve insert illustrated in Figs. 1 and 2, with the cooperating elements of the pump or motor removed.
Figure 4:
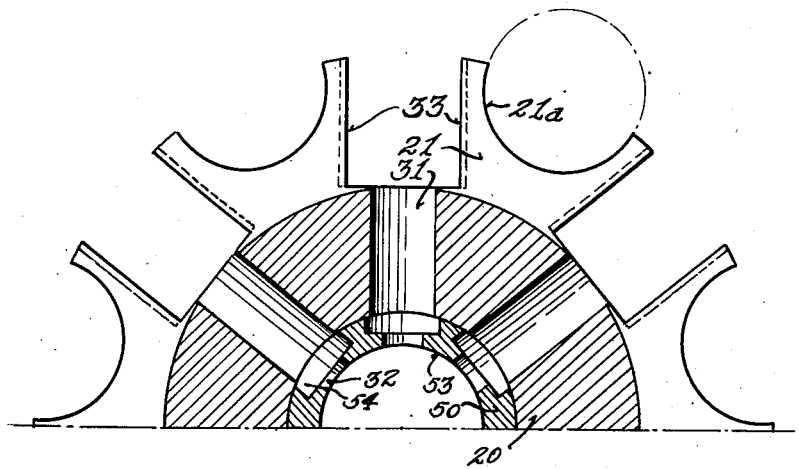
Fig. 4 is a fragmentary sectional view of the barrel and valve insert and is taken on line 4—4 in Fig. 3.
Figure 5:
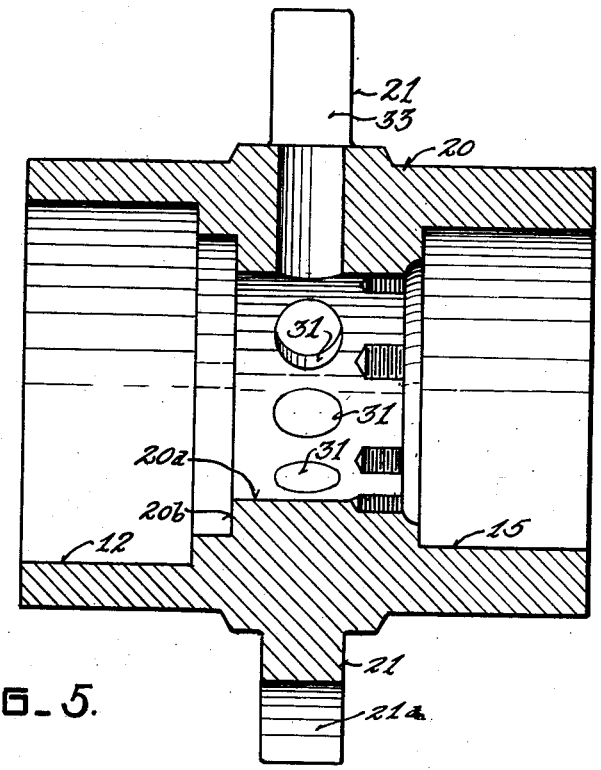
Fig. 5 is a sectional view of the barrel, similar to Fig. 3, with the valve insert removed.
Figure 6:
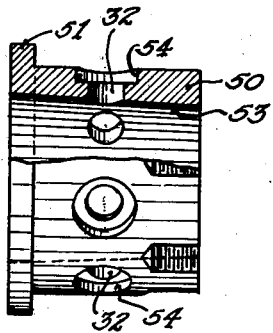
Fig. 6 is a side elevation, partly in section, of the valve insert for the barrel.
Figure 7:
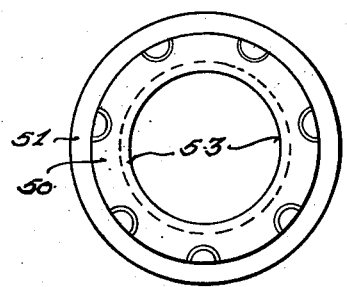
Fig. 7 is an end view of the valve insert illustrated in Fig. 6.

The insert 50 is provided at one end with a flange 51 and is inserted in the barrel with the flange 51 abutting a suitable radial shoulder, such as indicated at 20b in Fig. 3, so that the hydrostatic forces acting on the insert urge the flange 51 toward and firmly against the shoulder 20b of the barrel. At the opposite end, both the barrel and insert are provided with threaded portions defining suitable bores for receiving the locking screws 52 by which the insert is fixedly held in position circumferentially. By interposing shims between the flange 51 and shoulder 20b, adjustment of the insert to the left to compensate for wear may be provided.

As heretofore described, the adjustment of the bearings 11 and 14 may be effected through the medium of the nut 16. This adjustment of the bearings may cause movement of the barrel to the left in Fig. 1 and thus might change or eliminate the radial clearance between the bore of the insert 50 and the pintle. However, since the insert 50 is separately adjustable by adding or removing shims between the left-end flange thereof and the barrel, the desired radial clearance between the pintle and the insert 50 may be provided at all times. When adjustment is no longer possible between the insert and barrel, the insert can be removed and a slightly different insert utilized.

The insert 50 is free to expand radially inwardly, due to the radial clearance maintained between it and the pintle by the bearings 11 and 14 and the fact that the insert is not opposed in any way by the bearings. Furthermore, the insert 50 is free to expand axially toward its flanged end. Therefore, upon initial heating of the structure during operation, the insert 50, which necessarily heats first, is free to expand and does not become distorted. When the barrel heats and expands, the insert can accommodate itself to the barrel in the heated condition of the barrel. Further, by keeping the insert 50 spaced with the positive radial clearance between itself and the pintle, hydrostatic pressure can act against the compressive stresses imposed by the barrel upon the insert. The elastic resistance of the insert 50 is necessarily small, compared to the compressive force of the barrel, and therefore it must be accurately centered and spaced from the pintle if binding or permanent deformation is to be prevented.

Again, as heretofore mentioned, wear necessarily occurs between the pintle and insert 50. This wear is due not to the pintle alone or the bearings alone, but to chips, burrs and particles of foreign matter carried between the pintle and insert 50 by the fluid. Likewise, some wear occurs due to friction resulting from mechanical distortion of the pintle and barrel. In addition to this wear, there is the wear of the bearings 11 and 14 and their races. Obviously, the bearings 11 and 14 and their races have a different degree of taper from that of the pintle, and, furthermore, the radial clearance between the bearings and their races is very much less than that between th insert 50 and the pintle. Consequently, axial adjustment of the barrel or adjustment of the bearings alone would result in improper radial clearance between the insert 50 and the pintle. By the arrangement described, however, these different adjustments can be effected properly.

As an example of one adjustment, the nut 16 may be loosened, the barrel removed, and the race 11a shifted to the right in Fig. 1 and buttressed in adjusted position by shims, such that when the bearing 11 fits properly, the ports 32 will be aligned axially of the pintle with the ports 6. Next, with the barrel installed, the nut 16 may be tightened to move the race 14a to the left in Fig. 1 until the barrel is in proper axial alignment with respect to the ports 6, and the bearings 11 and 14 have the desired radial clearance. If the radial clearance of the pintle and insert 50 is found to be improper, the barrel is removed and the insert 50 is then adjusted so that when the barrel is reinstalled in its adjusted position, the proper radial clearance is provided between the insert and the pintle. When the proper radial clearance is determined, set screws, such as illustrated, are inserted to hold the insert at one end, new holes being drilled and tapped for this purpose, if necessary. Since the bearing 11 is not subjected to such a great degree of wear as the bearing 14, there is usually very little movement of the barrel upon tightening the nut 16. Consequently, the desired adjustment of the bearings usually can be obtained merely by shifting the insert 50 to the left as the radial clearance increases, and then securing the insert 50 in place and then adjusting the bearing 14 by tightening the nut 16.

In some instances, the valve insert is made of chrome nickel steel, or of cast iron alloyed with chrome, or of a material such that the insert can be removed and plated to restore material worn away from its tapered bore portion 53. Under these conditions it can be used indefinitely by successive platings. Finally a very distinct advantage is afforded by the removable insert in manufacture. It is necessary for efficient operation that the cylinders be honed to a mirror finish. It is equally desirable and necessary in most structures that the valve ports 32 of the cylinders be considerably less in diameter than the cylinders themselves. In honing the cylinders at high speed, it would be impossible to obtain the speed required because the length of possible stroke is limited by the ports 32. Accurate centering of the honing tool in a structure of this general character would be difficult due to the reduced ports. In fact, it would be impossible to hone the cylinders for the full length of the piston stroke with any degree of uniformity by a reciprocating tool as the lower ends, adjacent the ports 32, would be honed only a slight amount relative to the outermost ends of the cylinders, the latter being continuously exposed to the tool and the former intermittently exposed. With the removable insert 50, however, the ports 32 are formed in the insert and just adjacent the ports, cylinder portions 54 are provided which are slightly larger in diameter than the associated cylinders 31 so that slight axial adjustment of the insert relative to the barrel does expose any edge of the cylinder portions 54 within the limits of the cylinders 31.

Obviously, during reciprocation, the piston can extend entirely into the cylinder portions 54 without contacting with any surface at their extreme end peripheral margins. With the insert removed, the cylinders 31 are of constant diameter throughout their entire length and extend entirely through the barrel radially into the large bore 20a. This provides ample space for the insertion of a honing tool and for movement of the honing tool a sufficient distance so that it may be reciprocated at high speed and may be at all times in contact with the cylinders for their full length so as to contact each area of the cylinder walls an equal number and length of times for each reciprocation. As a result, a high mirror finish and uniformity of honing is obtained. In case a large number of pistons are used so that two cylinders are diametrically opposite and coaxial, even greater ease in the honing operation is possible.

As illustrated in Fig. 1, it is noted that suitable shims are provided between the cover plate 2 and the peripheral wall 1c, as indicated at 2d, and between the cover plate 2c and the hub 2a, as indicated at 27 and also between the flange of the insert 50 and the end of the barrel, as indicated at 50a.

Referring next to Figs. 8 and 9, a figure corresponding to the structure of Figs. 1 and 2 as illustrated except that the valve portion 63b of the pintle 63 is of constant diameter and a continuation of the bearing portions 63c and 63d. In such instance, the valve insert 70 corresponds in every way to the valve insert 50 except that the bore 73 thereof is not tapered but also is of constant diameter.

Another difference in the latter structure resides in the thrust pins. The thrust pins 38 of the structure first described were provided with reduced end portions 38a so that between the large central portion and the end portions, small radial shoulders were formed which engaged the reactance elements 40 and assisted in guiding and preventing skewing of the pins.

In the present structure, pins 78 are cylindrical and of constant diameter throughout, the ends thereof, as indicated at 78a, being flat and polished so as to be guided by the reactance elements 80, corresponding in form and function to the elements 40 above described. The end faces 78a of the pins 78 engage the flat and polished walls of the elements 80 with slight operating clearance. Since an oil retaining band 83 is provided between the elements 80, the pin 78 and outer ends of the pistons operate in a pressure oil bath so that the rollers 77 which mount the pins in the piston heads need not be capillary rollers. They are, however, spaced a capillary distance apart, the high pressure of the oil bath forcing the oil into the interstices therebetween. Constant diameter pins have a distinct advantage in precision work as they lend themselves to centerless grinding and finishing so that precision, accuracy and quality comparable to that of the elements 80 may be obtained economically.

Referring next to Fig. 10, there is illustrated a transmission mechanism employing both a pump and a motor embodying the principles hereof and illustrating a slight modification of the indirect support of the pintle. This structure will be referred to briefly as a transmission, the subject matter as to transmission cooperation and structure, however, apart from the specific pump or motor structure, being included in my copending application, Serial No. 30,608, filed July 10, 1935. In Fig. 10 there is illustrated a transmission structure having a rigid casing 90 and a central partition wall 91, the casing being closed at the ends by end cover plates 92 secured thereto, as illustrated. The partition wall 91 is provided with gauge ducts 93 and 94 respectively, which communicate respectively with the diametrically opposite main ports 95 and 96 of the pintle. The pintle is fixedly mounted between its ends in the partition wall 91. On the ends of the pintle are a pump and motor respectively, such as described heretofore in connection with Fig. 1, the pump and motor being preferably of the same size so that a wide variety of operating characteristics can be obtained. For example, the pump may be set at full stroke and the motor gradually reduced in stroke, thus providing a constant horsepower cycle with a pull power delivery at overspeed as high as ten to one. On the other hand the motor may be held constant and the pump reduced in stroke so as to provide a constant torque at variable speed from zero to the rated speed, that is, the driving speed of the pump shaft. Furthermore, all of these operations may be reversible.

For the purpose of illustrating the modification of the pump or motor, the left hand unit of Fig. 10 will be considered a pump. In this structure, the barrel 97 is rotatably mounted on tapered combination bearings 98 and 99, the inner race of the bearing 99 being adjustable axially of the pintle 96 for providing the desired diametral clearance of the bearings 99. Instead of the lock washer heretofore described, a lock nut 100 and jam nut 101 are provided for retaining this setting. The greatest difference, however, resides in the indirect support for the end of the pintle through the medium of the impeller shaft 102 which is connected to the barrel by a rigid nonyielding connection.

It has been found that adjustment at this point through the medium of a single bearing is not as satisfactory as adjustment by virtue of two oppositely disposed sets of tapered bearings. Consequently, instead of the single bearing 25 of Fig. 1, two oppositely tapered sets of bearings 103 and 104 are provided, these bearings having their inner races 105 and 106 mounted and locked in place on the impeller 102. The outer races 107 and 108 respectively of the bearings 103 and 104 are adjustably received in the end cover 92 for movement axially thereof, a suitable spacer being provided therebetween. Adjustment toward the pintle is effected through the medium of a supplemental cover plate 109 between which and the cover plate 92 suitable shims may be placed. Through the medium of bolts 110, the supplemental cover plate 109 is drawn against the outer race 108 of the bearings 104, thus moving this race and the race 107 toward the pintle for effecting the proper adjustment. Thus in this structure also the bearing 98 can be properly adjusted through the medium of the supplemental cover plate 109 so that the bearing 99 can be adjusted without undue tightening or binding of the bearing 98. In all such instances, the bearings are brought just to the point to eliminate diametral clearance so as to maintain absolute concentricity of the barrel and pintle without preloading the bearings.

I claim:

1. In a rotary pump or motor, a cylinder barrel comprising a main barrel portion having a plurality of cylinders therein, a valve insert secured in the barrel and having cylinder ports respective to the cylinders, a tapered valve member having ports for successive cooperation with the said ports, said insert having a valve portion tapered complementary to and cooperable with the tapered valve member, adjustable anti-friction bearings interposed between the barrel and valve member and positioned beyond the ends of said insert for constraining the barrel and valve member accurately in position with a predetermined positive radial clearance between the insert and valve member, said insert being adjustable axially relative to the barrel for adjusting the positive radial clearance between the cooperating surfaces of the insert and the valve member, and means for securing the insert in adjusted position axially of the barrel and in fixed circumferential position with respect to the barrel.

2. In a rotary pump or motor, a barrel comprising a main barrel portion having an axial passage and a plurality of cylinders opening thereinto, a valve insert fitting into said axial passage and secured to the barrel and having ports respective to the cylinders and having an axial, tapered valve bore, a tapered valve member coaxial with and tapered complementary to and hydraulically fitting the axial valve bore of the insert, means for connecting the insert in said passage at one end of the insert, said insert being unconstrained at its other end for affording free expansion of the insert axially of the barrel in one direction, anti-friction bearing means arranged for supporting said barrel in coaxial relation with the valve member with positive radial clearance between the axial valve bore of the insert and said tapered valve member, and said insert being unconstrained by said anti-friction bearing means from axial expansion.

3. In a rotary pump or motor, a barrel comprising a main barrel portion having an axial passage and a plurality of cylinders opening into said passage, a removable valve insert fitting into said axial passage and having cylinder ports respective to the cylinders and having a tapered valve bore, a valve pintle having a valve portion tapered complementary to said bore and valve ports in said portion, said pintle being coaxial with and hydraulically fitting said bore, a flange on one end of the insert, a shoulder on the adjacent end of the barrel, said flange and shoulder providing cooperating abutments for constraining the insert from movement beyond a predetermined position relative to the barrel in the direction of hydraulic axial thrust and for receiving therebetween means for limiting the axial movement of the insert in said direction relative to the barrel, and means for securing the other end of the insert to the barrel in fixed position axially of the barrel whereby the insert may be adjusted axially relative to the barrel and is unconstrained at one end from axial expansion, and bearing means rotatably supporting the barrel with fixed radial clearance between the valve bore of the insert and the valve portion of the pintle.

4. In a rotary pump or motor, a barrel comprising a main barrel portion having an axial passage and a plurality of cylinders opening into said passage, a valve insert carried in said passage and adjustable axially relative to the barrel, means for securing the insert in predetermined axial adjusted position, said insert having cylinder ports respective to the cylinders and having a tapered valve bore, a pintle having a valve portion complementary to and hydraulically fitting the valve bore, adjustable bearing means rotatably supporting the barrel with predetermined positive radial clearance between the said valve bore and pintle valve portion, and means for securing the insert in fixed circumferential position in the main barrel portion, independently of the adjustment of said adjustable bearing means, and affording free axial expansion of the insert in one direction.

5. In a rotary pump or motor, a barrel comprising a main barrel portion having an axial passage and a plurality of cylinders opening into said passage, a valve insert carried in said passage and adjustable axially relative to the barrel, means for securing the insert in predetermined axial adjusted position, said insert having cylinder ports respective to the cylinders and having a tapered valve bore, a pintle having a valve portion complementary to and hydraulically fitting the valve bore, adjustable bearing means rotatably supporting the barrel with predetermined positive radial clearance between the said valve bore and pintle valve portion, and means for securing the insert in fixed circumferential position in the main barrel portion, independently of the adjustment of said adjustable bearing means.

6. In a rotary piston pump or motor, a rotatable barrel and a valve pintle, said barrel having an axial passage and a plurality of cylinders opening into said passage, said pintle having a tapered valve portion, a valve insert carried by the barrel in said passage and having cylinder ports respective to the cylinders and having an axial bore tapered complementary to and hydraulically fitting the pintle, means for securing the insert in axially adjusted positions, tapered anti-friction bearing means interposed between one end of the barrel and mounted in fixed position with respect to the pintle near one end of the pintle and tapered toward the opposite end of the pintle and rotatably supporting the barrel at one end, anti-friction bearing means at the opposite end of the barrel and rotatably supporting the barrel and comprising an outer race fixedly secured in said other end of the barrel and an inner race mounted for axial movement with respect to the barrel toward the first mentioned end of the barrel, tapered anti-friction elements between the races, means for adjusting the axial position of said inner race and for securing the said inner race in adjusted position, whereby the barrel is rotatably supported with radial clearance relative to the pintle, said insert being adjustable axially relative to the barrel independently of the adjustment of said anti-friction bearing means for providing positive, predetermined radial clearance between the pintle and valve bore in all adjusted positions of said bearing means, and means for securing the insert in axial adjusted position in the barrel.

ELEK K. BENEDEK.